US010598993B2

(12) United States Patent
Horiuchi et al.

(10) Patent No.: US 10,598,993 B2
(45) Date of Patent: Mar. 24, 2020

(54) LIQUID CRYSTAL DISPLAY DEVICE

(71) Applicant: Sharp Kabushiki Kaisha, Sakai, Osaka (JP)

(72) Inventors: Satoshi Horiuchi, Sakai (JP); Seijirou Gyouten, Sakai (JP); Sachio Tsujino, Sakai (JP); Takehiko Kawamura, Sakai (JP); Junichi Morinaga, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 16/317,163

(22) PCT Filed: Jul. 10, 2017

(86) PCT No.: PCT/JP2017/025128
§ 371 (c)(1),
(2) Date: Jan. 11, 2019

(87) PCT Pub. No.: WO2018/012455
PCT Pub. Date: Jan. 18, 2018

(65) Prior Publication Data
US 2019/0250478 A1    Aug. 15, 2019

(30) Foreign Application Priority Data

Jul. 12, 2016 (JP) ................................. 2016-137302

(51) Int. Cl.
*G02F 1/1345* (2006.01)
(52) U.S. Cl.
CPC ........ *G02F 1/13452* (2013.01); *G02F 1/1345* (2013.01)
(58) Field of Classification Search
CPC ........... G02F 1/13452; G02F 1/136286; G02F 1/1345
See application file for complete search history.

(56) References Cited

U.S. PATENT DOCUMENTS

2009/0102758 A1    4/2009 Anzai et al.
2009/0195721 A1    8/2009 Tanahara
(Continued)

FOREIGN PATENT DOCUMENTS

JP    2009-069768 A    4/2009
JP    2009-134246 A    6/2009
(Continued)

OTHER PUBLICATIONS

Official Communication issued in International Patent Application No. PCT/JP2017/025128, dated Oct. 17, 2017.

*Primary Examiner* — Thanh Nhan P Nguyen
(74) *Attorney, Agent, or Firm* — Keating & Bennett, LLP

(57) ABSTRACT

Provided is a technique of suppressing display defects such as flicker, without limiting the arrangement of data lines, in a liquid crystal display device having a display area in a non-rectangular shape. A liquid crystal display device includes an active matrix substrate 10, a counter substrate, and a liquid crystal layer. The active matrix substrate 10 includes a plurality of gate lines 11, and a plurality of data lines 12. In each of pixels defined by the gate lines 11 and the data lines 12, a pixel electrode 14 is arranged, and in a display area R, common electrodes 15 are provided. Outside the display area R, capacitance-generating parts C that generate capacitances between some gate lines 11 among the plurality of gate lines 11 and the common electrode are provided. The some gate lines 11 have lengths smaller than the gate lines having the maximum length, and intersect with some data lines 12 among the plurality of data lines 12. The capacitance-generating parts C are provided in such a manner that at least one capacitance-generating part C is provided with respect to one of the some gate lines 11.

6 Claims, 11 Drawing Sheets

(56) References Cited

U.S. PATENT DOCUMENTS

| | | | |
|---|---|---|---|
| 2010/0141570 | A1 | 6/2010 | Horiuchi et al. |
| 2010/0156945 | A1 | 6/2010 | Yoshida |
| 2013/0063406 | A1 | 3/2013 | Nishino et al. |

FOREIGN PATENT DOCUMENTS

| | | | |
|---|---|---|---|
| JP | 2009-186737 A | 8/2009 |
| JP | 2011-039559 A | 2/2011 |
| JP | 2013-061389 A | 4/2013 |
| WO | 2008/062575 A1 | 5/2008 |
| WO | 2009/054166 A1 | 4/2009 |
| WO | 2012/023467 A1 | 2/2012 |

LIQUID CRYSTAL DISPLAY DEVICE

TECHNICAL FIELD

The present invention relates to a liquid crystal display device.

BACKGROUND ART

In a liquid crystal display device, a thin film transistor (TFT) is provided at a position at which a gate line (scanning line) and a data line intersect in an active matrix substrate, and the TFT is connected with a pixel electrode. In such a liquid crystal display device, a voltage change in a drain voltage of the TFT, which is called a feedthrough voltage, occurs due to a parasitic capacitance formed between a gate electrode of the TFT and the drain electrode connected with a pixel electrode, when a gate signal shifts from ON to OFF. This causes the potential of the pixel electrode to decreases by the feedthrough voltage. For example, in a case where a display area has a non-rectangular shape such as a circular shape, the lengths of the gate lines are not uniform, the number of data lines intersecting with each gate line varies, and the number of the TFTs connected with each gate line also varies. When differences occur to loads on the gate lines, this makes the waveform dullness different among the gate lines, thereby making the timing when the gate signal shifts from ON to OFF different. As a result, the difference of the timing when the gate signal shifts from ON to OFF causes a difference in the feedthrough voltage, leading to changes in the potentials of the pixel electrodes, and causing display defects such as flicker to occur.

JP-A-2009-69768 discloses a technique of making capacitances of the gate lines uniform in a liquid crystal display device having a circular display area, so as to suppress display defects. On an array substrate disclosed in JP-A-2009-69768, a plurality of scanning lines and a plurality of signal lines are provided. A part of the signal lines are arranged so as to be routed out along peripheral portions of the display area so that all of the scanning lines should intersect with all of the signal lines. In JP-A-2009-69768, capacitances of the scanning lines are made uniform by causing all of the scanning lines to intersect with all of the signal lines.

In the case of JP-A-2009-69768, by causing all of the scanning lines to intersect with all of the signal lines, display defects can be suppressed, but the signal lines have to be routed out along the peripheral portions of the display area. Since driving circuits for driving the scanning lines are also provided in frame areas of the peripheral portions of the display area, the area where the signal lines are arranged is limited. As the area for arranging the signal lines is smaller, the signal lines have to be arranged at narrower intervals, which makes it likely that signal lines would be short-circuited.

It is an object of the present invention to provide a technique of suppressing display defects such as flicker without limiting the arrangement of the data lines, in a liquid crystal display device having a display area having a non-rectangular shape.

A liquid crystal display device in one embodiment of the present invention is a liquid crystal display device including an active matrix substrate, a counter substrate, and a liquid crystal layer interposed between the active matrix substrate and the counter substrate. The active matrix substrate includes: a plurality of gate lines; a plurality of data lines; a plurality of pixel electrodes provided in a plurality of pixels, respectively, the pixels being defined by the gate lines and the data lines; a common electrode provided in a display area composed of the pixels; and capacitance-generating parts that are provided outside the display area, and that generate capacitances between a group of the gate lines among the plurality of the gate lines and the common electrode, wherein the gate lines of the group have a length smaller than that of the gate line having a maximum length, and intersect with a group of the data lines, and the capacitance-generating parts are provided in such a manner that at least one capacitance-generating part is provided with respect to one gate line among the gate lines of the group.

With the present invention, it is possible to suppress display defects such as flicker, without limiting the arrangement of data lines, in a liquid crystal display device having a display area in a non-rectangular shape.

MODE FOR CARRYING OUT THE INVENTION

Figure 1:
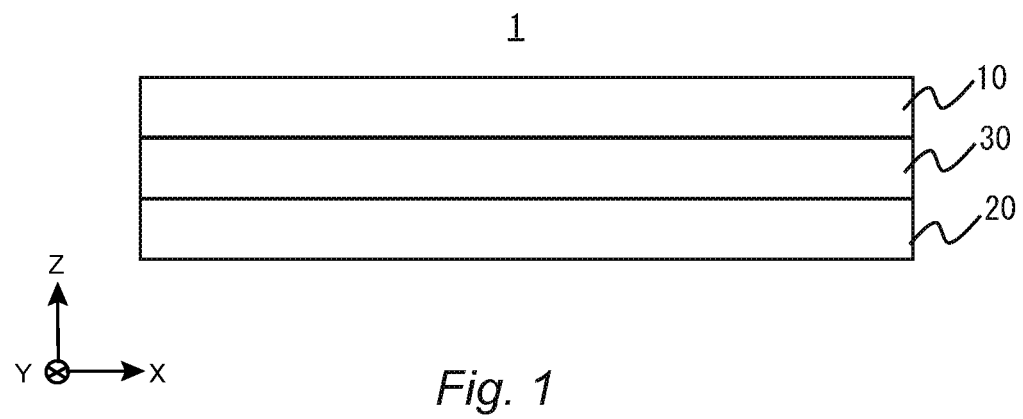
FIG. 1 is a cross-sectional view of a liquid crystal display device in Embodiment 1.

A liquid crystal display device according to one embodiment of the present invention is a liquid crystal display device including an active matrix substrate, a counter substrate, and a liquid crystal layer interposed between the active matrix substrate and the counter substrate. The active matrix substrate includes; a plurality of gate lines; a plurality of data lines; a plurality of pixel electrodes provided in a plurality of pixels, respectively, the pixels being defined by the gate lines and the data lines; a common electrode provided in a display area composed of the pixels; and capacitance-generating parts that are provided outside the display area, and that generate capacitances between a group of the gate lines among the plurality of gate lines and the common electrode, wherein the gate lines of the group have a length smaller than that of the gate line having a maximum length, and intersect with a group of the data lines, and the capacitance-generating parts are provided in such a manner that at least one capacitance-generating part is provided with respect to one gate line among the gate lines of the group (the first configuration).

According to the first configuration, the liquid crystal display device includes, in the active matrix substrate, a plurality of gate lines, a plurality of data lines, a plurality of pixel electrodes provided in the pixels, respectively, a common electrode provided in a display area, and capacitance-generating parts provided outside the display area. The capacitance-generating parts are provided in such a manner that at least one capacitance-generating part is provided with respect to a group of the gate lines that have a length smaller than that of the gate line having a maximum length and intersect with a group of the data lines, and the capacitance-generating parts generate capacitances between the group of the gate lines and the common electrode. This allows the gate lines intersecting with only a group of the data lines to have greater capacitances, and thereby makes it possible to reduce capacitance differences between the gate lines having the maximum length and the gate lines having smaller lengths than the maximum length. As a result, it is possible to suppress display defects such as flicker, without limiting the arrangement of data lines.

The first configuration may be such that each capacitance-generating part includes an upper electrode, a lower electrode, and an insulating layer provided between the upper electrode and the lower electrode, and each of the upper electrode and the lower electrode is formed with at least one of a first transparent electrode film made of the same material as that of the pixel electrodes, a second transparent electrode film made of the same material as that of the common electrode, a first metal film made of the same material as that of the gate lines, and a second metal film made of the same material as that of the data lines (the second configuration).

According to the second configuration, capacitance is generated between the upper electrode and the lower electrode in the capacitance-generating part. This makes it possible to reduce capacitance differences between the gate lines of one group to which the capacitance-generating parts are provided and the gate lines having the maximum length. Besides, each of the upper electrode and the lower electrode is formed with the same material as that of at least one of the pixel electrodes, the common electrode, the gate lines, and the data lines, and thereby can be formed by the steps of forming these elements.

The second configuration may be such that the active matrix substrate further includes a plurality of switching elements that include semiconductor films; the upper electrode includes the second metal film, the first transparent electrode film, and the second transparent electrode film that is connected to the first transparent electrode film and is connected to the common electrode; the lower electrode includes the first metal film connected with the gate lines of the group; and each capacitance-generating part includes a semiconductor layer made of the same material as that of the semiconductor film, between the upper electrode and the insulating layer (the third configuration).

With the third configuration, the capacitance-generating parts can be formed by the steps of forming the gate lines, the data lines, the pixel electrodes, the common electrodes, and the switching elements.

The second configuration may be such that the upper electrode includes the first transparent electrode film, and the second transparent electrode film that is connected to the first transparent electrode film and is connected to the common electrode; and the lower electrode includes the first metal film that is provided below the upper electrode and is connected with the gate lines of the group (the fourth configuration).

With the fourth configuration, the capacitance-generating parts can be formed by the steps of forming the gate lines, the pixel electrodes and the common electrode.

The second configuration may be such that the upper electrode includes the second metal film, the first transparent electrode film arranged so as to overlap with the second metal film, and the second transparent electrode film that is connected to the first transparent electrode film and is connected to the common electrode; and the lower electrode includes the first metal film that is provided below the upper electrode and is connected with the gate lines of the group (the fifth configuration).

With the fifth configuration, the capacitance-generating parts can be formed by the steps of forming the gate lines, the data lines, the pixel electrodes, and the common electrode.

The second configuration may be such that the upper electrode includes the second transparent electrode film connected with the common electrode; and the lower electrode includes the first metal film that is provided below the upper electrode and is connected with the gate lines of the group, the second metal film arranged so as to be in contact with the first metal film, and the first transparent electrode film arranged so as to overlap with the second metal film (the sixth configuration).

With the sixth configuration, the capacitance-generating parts can be formed by the steps of forming the gate lines, the data lines, and the pixel electrodes.

Any one of the first to sixth configurations may be such that the capacitance-generating parts are provided in the vicinity of ends of the gate lines of the group (the seventh configuration).

According to the seventh configuration, outside the display area, the capacitance-generating parts are arranged in the vicinity of ends of a group of the gate lines having smaller lengths than the maximum length. This makes it possible to generate capacitances with respect to a group of the gate lines, without limiting the arrangement of data lines.

Any one of the first to seventh configurations may be such that the active matrix substrate further includes, outside the display area, a plurality of driving circuits for scanning the gate lines, and lines that supply a control signal to the driving circuits; the lines are made of the same material as that of at least either the gate lines or the data lines; and the capacitance-generating parts are provided between the driving circuits and a boundary of the display area (the eighth configuration).

With the eighth configuration, lines for supplying a control signal to the driving circuits can be formed by the at least either the step of forming the gate lines or the step of forming the data lines. Further, since the capacitance-generating parts are provided between the driving circuits and the boundary of the display area, the capacitance-generating parts can be arranged in the vicinity of the display area, whereby the frame area can be formed in a smaller size.

The eighth configuration may be such that the active matrix substrate further includes a plurality of pixel switching elements that are provided with respect to the pixels, respectively; the driving circuits include a plurality of driving circuit switching elements; and each of the pixel switching elements and the driving circuit switching elements includes a semiconductor film made of a same material (the ninth configuration).

With the ninth configuration, the semiconductor films of the pixel switching elements and the driving circuit switching elements can be formed by a common step.

Any one of the first to ninth configurations may be such that the counter substrate further includes a light shielding film outside the display area; and the capacitance-generating parts overlap with the light shielding film when viewed in a plan view (the tenth configuration).

With the tenth configuration, in a case where at least either the upper electrode and the lower electrode is made of a metal material, the light shielding film prevents external light from being reflected by the metal material and glaring.

Any one of the first to tenth configurations may be such that the display area, the active matrix substrate, and the counter substrate have a non-rectangular shape (the eleventh configuration).

With the eleventh configuration, a liquid crystal display device having a non-rectangular shape, in which display defects such as flicker are suppressed, can be provided.

EMBODIMENT 1

The following describes embodiments of the present invention in detail, while referring to the drawings. Identical or equivalent parts in the drawings are denoted by the same reference numerals, and the descriptions of the same are not repeated. To make the description easy to understand, in the drawings referred to hereinafter, the configurations are simply illustrated or schematically illustrated, or the illustration of part of constituent members is omitted. Further, the dimension ratios of the constituent members illustrated in the drawings do not necessarily indicate the real dimension ratios.

FIG. 1 is a cross-sectional view of a liquid crystal display device 1 in the present embodiment. The liquid crystal display device 1 in the present embodiment includes an active matrix substrate 10, a counter substrate 20, and a liquid crystal layer 30 interposed between the active matrix substrate 10 and the counter substrate 20. Further, though the illustration is omitted in FIG. 1, a pair of polarizing plates are provided so that the active matrix substrate 10 and the counter substrate 20 are interposed therebetween, and a backlight is provided on the active matrix substrate 10 side.

In the liquid crystal display device 1, the method for driving liquid crystal molecules included in the liquid crystal layer 30 is the horizontal electric field driving method. To realize the horizontal electric field driving method, pixel electrodes and common electrodes for generating electric fields are formed in the active matrix substrate 10.

Figure 2:
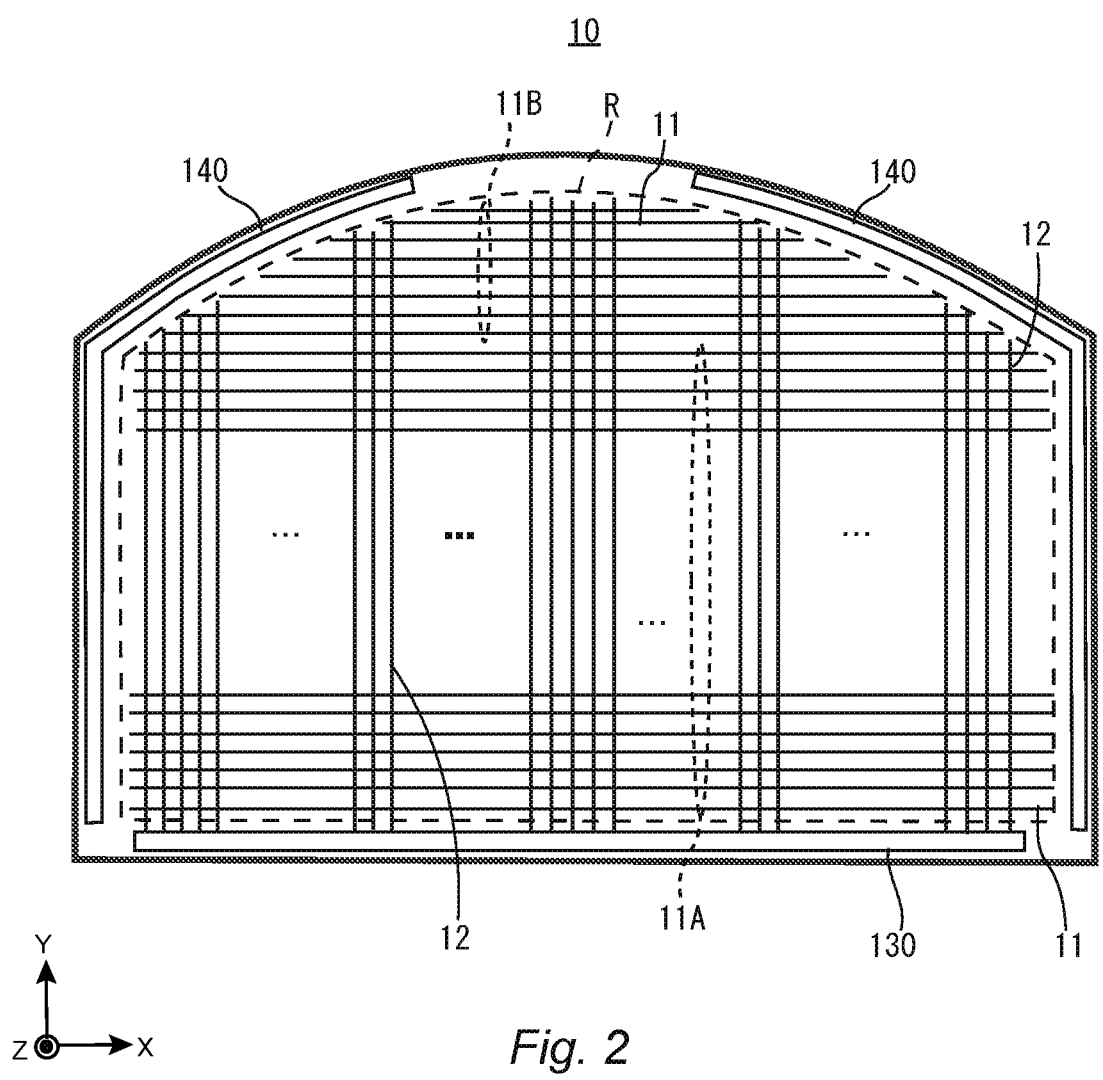
FIG. 2 schematically illustrates a schematic configuration of an active matrix substrate illustrated in FIG. 1.

FIG. 2 schematically illustrates a schematic configuration of the active matrix substrate 10. On a surface of the active matrix substrate 10 opposed to the liquid crystal layer 30, there are provided a plurality of gate lines 11 arrayed in the Y axis direction, and a plurality of data lines 12 arrayed in the X axis direction. The active matrix substrate 10 has a plurality of pixels defined by the gate lines 11 and the data lines 12, and an area in which the pixels are formed serves as a display area R of the active matrix substrate 10. As illustrated in FIG. 2, the display area R has a non-rectangular shape whose upper side is in an arc shape.

In each pixel, a pixel electrode and a switching element are arranged. As the switching element, for example, a TFT is used. The gate electrode of the TFT is connected with the gate line 11, the source electrode thereof is connected with the data line 12, and the drain electrode thereof is connected with the pixel electrode.

The active matrix substrate 10 includes a source driver 130 in the vicinity of ends on one side of the data lines 12, that is, in the vicinity of the side opposite to the arc-shaped side, in an area outside the display area R (a frame area). Besides, in the frame area, the active matrix substrate 10 includes gate drivers 140 in the vicinity of ends on both sides of the gate lines 11.

The source driver 130 is connected with each data line 12, and supplies voltage signals corresponding to image data, to the data lines 12, respectively.

The gate driver 140 includes a plurality of shift registers each of which is formed by combining a plurality of TFTs. The shift registers are arranged dispersedly. The shift registers of the gate driver 140 are connected with the gate lines 11, respectively. Each shift register supplies a voltage signal to the gate line 11, so that the gate lines 11 are scanned. In this example, voltage signals are supplied to each gate line 11 from the two gate drivers 140 provided on both ends of the gate lines 11, so that the gate lines 11 are scanned, but the gate lines 11 may be scanned by one gate driver 140. Incidentally, the TFTs included in the shift registers are formed by utilizing at least a part of the steps for forming the switching elements of the pixels. The lines for supplying control signals for driving the gate drivers 140 may be formed with the same line material as the line material in the same layer such as the gate lines 11 or the data lines 12.

Among the gate lines 11 illustrated in FIG. 2, regarding a gate line group 11A of the gate lines 11 having the maximum length (in the width direction of the active matrix substrate), the gate lines 11 intersect with all of the data lines 12; on the other hand, regarding a gate line group 11B of the gate lines 11 having lengths smaller than that of the gate lines 11 of the gate line group 11A, the gate lines 11 intersect with only a part of the data lines 12. In other words, the number of the data lines 12 with which the gate lines 11 of the gate line group 11B intersect, and the number of the TFTs (not shown) connected with the gate lines 11 of the gate line group 11B, are smaller than the number of the data lines 12 with which the gate lines 11 of the gate line group 11A intersect, and the number of the TFTs (not shown) connected with the gate lines 11 of the gate line group 11A.

In this example, the gate lines 11 of the gate line group 11A have a time constant of about 1.7 (capacitance=about 150 pF), and the gate lines 11 of the gate line group 11B has a time constant of about 0.3 (capacitance=about 10 pF). In other words, the gate lines 11 of the gate line group 11B have smaller capacity loads between the data lines 12 and the TFTs, as compared with the gate line group 11A. In the active matrix substrate 10, therefore, in order to make the capacity loads of the gate lines 11 in the gate line group 11A and the gate line group 11B uniform, capacitance is generated with respect to each gate line 11 in the gate line group 11B. The following description specifically describes a method for generating capacitances with respect to the gate line group 11B.

Figure 3:
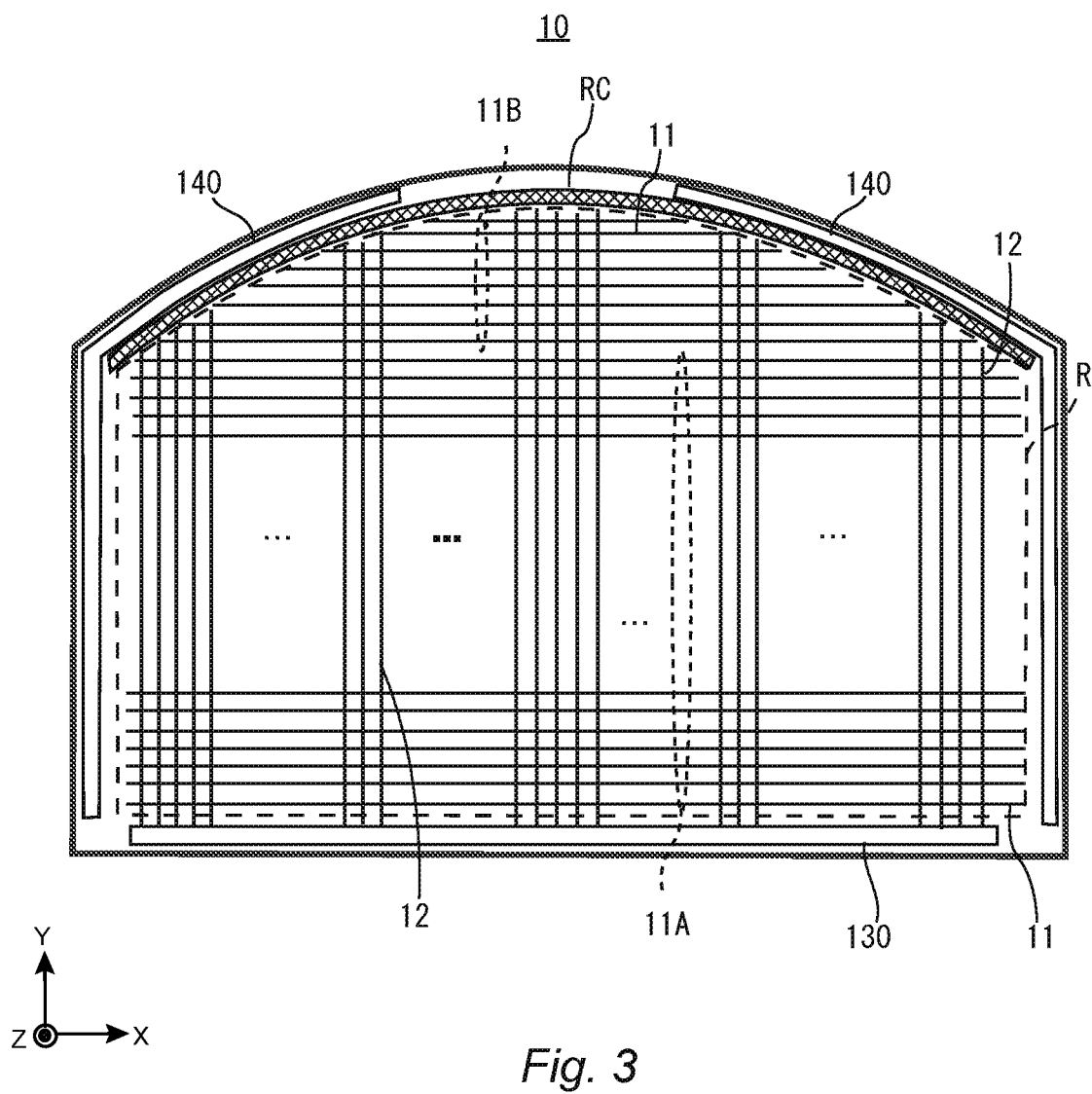
FIG. 3 schematically illustrates a capacitance-generating area in the active matrix substrate.

FIG. 3 schematically illustrates an area where capacitances are generated with respect to the gate lines 11 of the gate line group 11B in the active matrix substrate 10. As illustrated in FIG. 3, capacitances are generated in an area RC in an arc shape in the vicinity of the ends of the gate lines 11 of the gate line group 11B, between the gate drivers 140 and the boundary of the display area R in the frame area of the active matrix substrate 10. Hereinafter this area is referred to as a capacitance-generating area RC.

In the counter substrate 20 illustrated in FIG. 1, a color filter (not shown) that are colored in red (R), green (G), and blue (B) at positions corresponding to the pixels in the display area R, respectively, is provided. Besides, on the counter substrate 20, a black matrix (light shielding film) (not shown) is provided in an area outside the display area R, including the capacitance-generating area RC, the driving circuit areas where the gate driver 140 and the source driver 130 are provided, and the like. The capacitance-generating area RC and the black matrix overlap with each other when viewed in a plan view.

Figure 4:
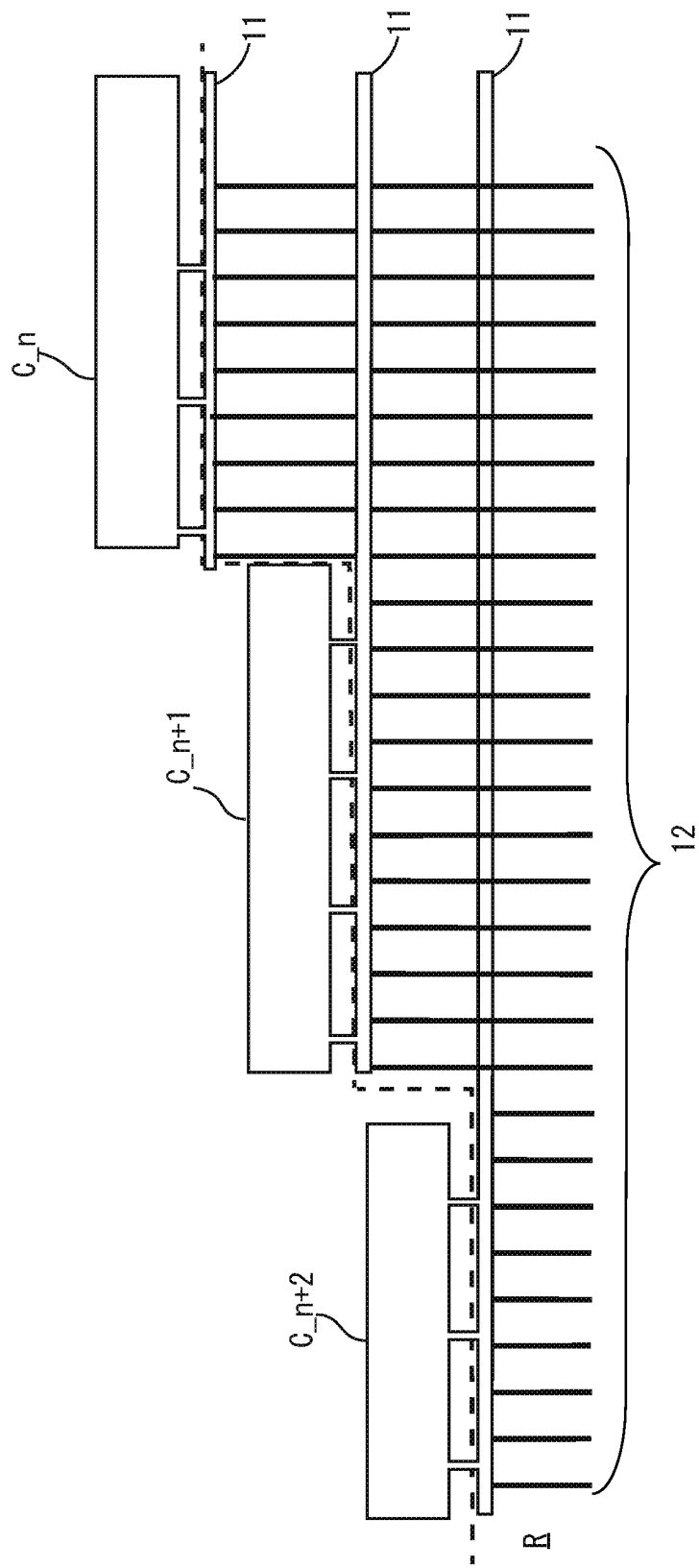
FIG. 4 is an enlarged diagram schematically illustrating a part of the capacitance-generating area illustrated in FIG. 3.

FIG. 4 is an enlarged schematic diagram of a part of the capacitance-generating area RC. As illustrated in FIG. 4, capacitance-generating parts C_n, C_n+1, C_n+2 . . . are provided with respect to the gate lines 11n, 11n+1, 11n+2 . . . included in the gate line group 11B, respectively. Each capacitance-generating part is provided in the vicinity of the end of the corresponding gate line 11 in the frame area. Hereinafter, when the capacitance-generating parts C_n, C_n+1, C_n+2 . . . are not distinguished, they are generally referred to as capacitance-generating parts C.

Figure 5A:
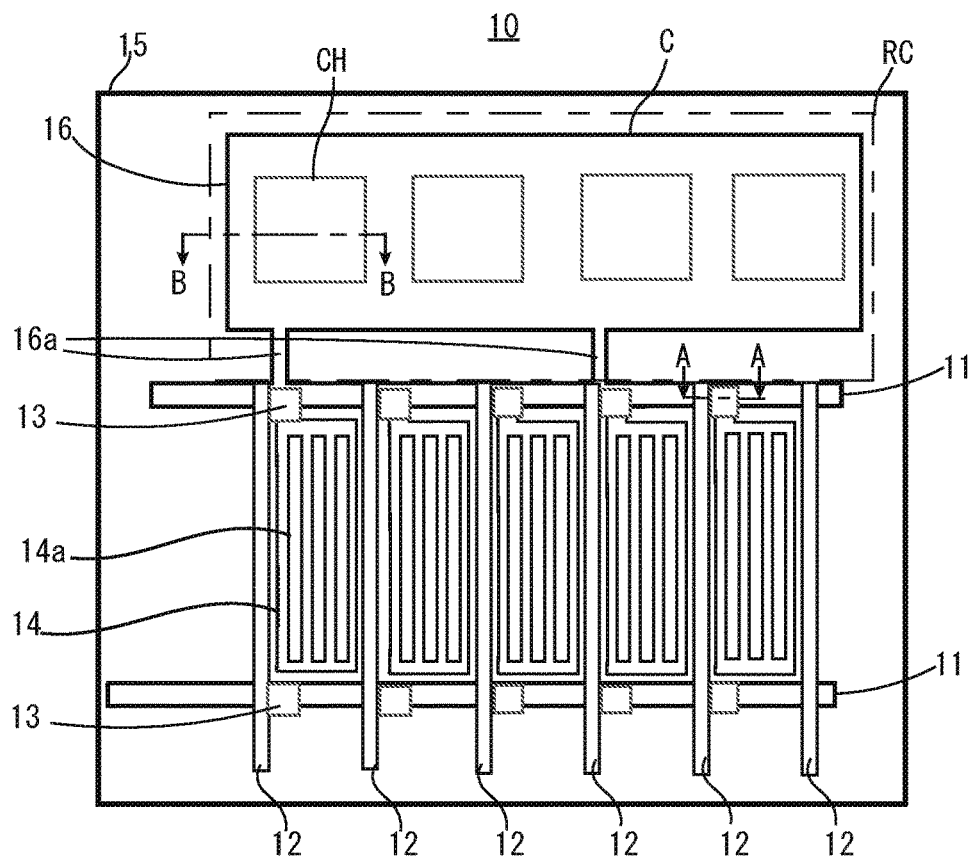
FIG. 5A is an enlarged diagram schematically illustrating a part of the area of the active matrix substrate including the capacitance-generating area illustrated in FIG. 4.

FIG. 5A is an enlarged diagram schematically illustrating a part of the area of the active matrix substrate 10 that includes the capacitance-generating part C illustrated in FIG. 4.

As illustrated in FIG. 5A, in each pixel in the active matrix substrate 10, a TFT 13 is arranged at a position where the gate line 11 and the data line 12 intersect with each other. Further, in each pixel, a pixel electrode 14 connected with the drain electrode of the TFT 13 is arranged. In the pixel electrode 14, slits 14a are formed. Still further, a common electrode 15 is arranged so as to overlap with the pixel electrode 14 when viewed in a plan view and extend over the capacitance-generating area RC.

The capacitance-generating part C includes connection parts 16a connected with the gate line 11, and an electrode 16 connected with the connection parts 16a. The capacitance-generating part C generates capacitance between the common electrode 15 and the gate line 11 that is connected to the capacitance-generating part C via the connection parts 16a.

Figure 5B:
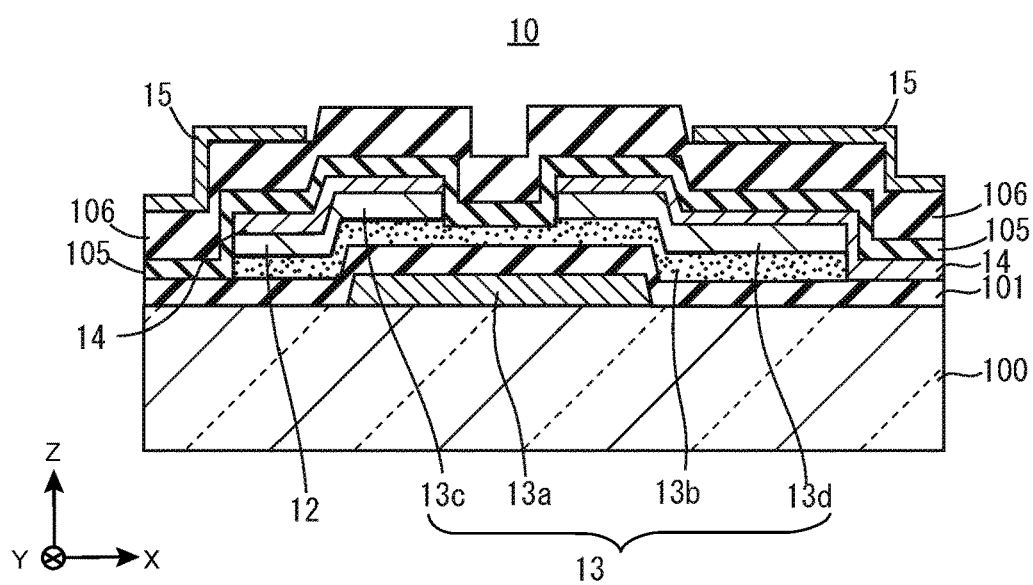
FIG. 5B schematically illustrates a cross section taken along line A-A in FIG. 5A.

FIG. 5B illustrates a cross section of the active matrix substrate 10 taken along line A-A in FIG. 5A, that is, it is a cross-sectional view of a TFT area where the TFT 13 is formed. Further, FIG. 5C illustrates a cross section of the active matrix substrate 10 taking along line B-B in FIG. 5A, that is, it is a cross-sectional view of the capacitance-generating part C.

As illustrated in FIG. 5B, in the TFT area, the TFT 13 is formed. The TFT 13 includes a gate electrode 13a, a semiconductor portion 13b, a source electrode 13c, and a drain electrode 13d. The gate electrode 13a is arranged so as to be in contact with the glass substrate 100. Further, as illustrated in FIG. 5C, in the capacitance-generating part C, the electrode 16 is arranged on the glass substrate 100. The electrode 16 is connected with one of the gate lines 11 in the gate line group 11B (see FIG. 2). The gate electrode 13a and the electrode 16 are made of the same material as that of the gate lines 11. More specifically, the gate electrode 13a and the electrode 16 are formed with, for example, laminate metal films obtained by laminating titanium (Ti), aluminum (Al), and titanium (Ti) sequentially in the stated order. In the laminate metal film, the film of titanium (Ti) and the film of aluminum (Al) provided in upper layers have a thickness of, for example, 30 nm, and a thickness of, for example, 200 nm, respectively; and the film of titanium (Ti) provided in a lower layer has a thickness of, for example, 100 nm.

Figure 5C:
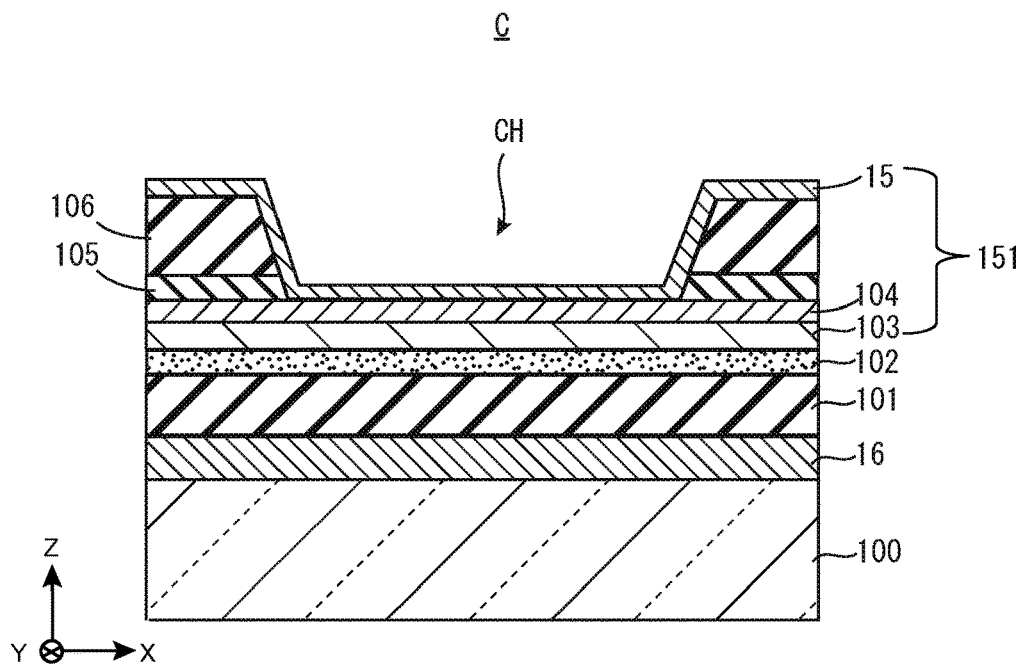
FIG. 5C schematically illustrates a cross section taken along line B-B in FIG. 5A.

As illustrated in FIGS. 5B and 5C, a gate insulating film 101 is provided so as to cover the gate electrode 13a in the TFT area, and the electrode 16 in the capacitance-generating part C. The gate insulating film 101 is formed with an insulating film containing, for example, silicon nitride (SiN$_x$) and the like. The gate insulating film 101 has a thickness of, for example, 410 nm.

As illustrated in FIG. 5B, in the TFT area, on the gate insulating film 101, the semiconductor portion 13b is arranged so as to overlap with the gate electrode 13a. Further, as illustrated in FIG. 5C, in the capacitance-generating part C, a semiconductor layer 102 is arranged on the gate insulating film 101. The semiconductor portion 13b and semiconductor layer 102 are formed with, for example, a laminate film obtained by sequentially laminating an amorphous silicon film (a-Si), and an amorphous silicon film (a-Si(n+)) doped with phosphorus. For example, the film of a-Si has a thickness of 130 nm, and the film of a-Si(n+) has a thickness of 40 nm.

As illustrated in FIG. 5B, on the semiconductor portion 13b in the TFT area, the source electrode 13c provided integrally with the data line 12, and the drain electrode 13d, are arranged so as to be positioned apart from each other. As illustrated in FIG. 5C, on the semiconductor layer 102 in the capacitance-generating part C, a metal film (source layer) 103 is arranged. The data line 12 and the source electrode 13c, the drain electrode 13d, and the metal film (source layer) 103 are formed with, for example, a metal film containing molybdenum niobium (MoNb) and the like.

As illustrated in FIG. 5B, in the TFT area, the pixel electrode 14 is arranged on the source electrode 13c and the drain electrode 13d. As illustrated in FIG. 5O, in the capacitance-generating part C, a transparent electrode film 104 is arranged so as to be in contact with the metal film 103. The pixel electrode 14 and the transparent electrode film 104 are formed with, for example, a transparent conductive film containing indium oxide and zinc oxide (IZO), or the like.

As illustrated in FIG. 5B, in the TFT area, a first insulating film 105 is arranged so as to cover the semiconductor portion 13b and the pixel electrode 14, and a second insulating film 106 is arranged on the first insulating film 105. As illustrated in FIG. 5O, in the capacitance-generating part C, on a part of the transparent electrode film 104, the first insulating film 105 is arranged, and the second insulating film 106 is arranged on the first insulating film 105. The first insulating film 105 and the second insulating film 106 are formed with, for example, an insulating film made of silicon nitride ($SiN_x$) or the like. The first insulating film 105 has a thickness of, for example, 250 nm, and the second insulating film 106 has a thickness of, for example, 500 nm.

As illustrated in FIGS. 5B and 5C, in the TFT area and the capacitance-generating part C, the common electrode 15 is arranged on the second insulating film 106. Further, as illustrated in FIG. 5O, the capacitance-generating part C has a contact hole CH passing through the first insulating film 105 and the second insulating film 106, and the common electrode 15 and the transparent electrode film 104 are connected via the contact hole CH. The common electrode 15 is formed with, for example, a transparent conductive film containing indium oxide and zinc oxide (IZO), or the like.

The capacitance-generating part C includes, as a lower electrode, the electrode 16 connected to one of the gate lines 11 in the gate line group 11B, and includes, as an upper electrode 151, the transparent electrode film 104 and the metal film (source layer) 103 connected with the common electrode 15 provided in the capacitance-generating area RC, as illustrated in FIG. 5C. The capacitance-generating part C generates capacitance between the electrodes 16 as the lower electrode and the upper electrode 151. The gate line 11 in the gate line group 11B, therefore, has a capacitance generated in the capacitance-generating part C, which results in that capacitance differences between the gate line group 11B and the gate line group 11A can be reduced.

Incidentally, in this example, the capacitance of the capacitance-generating part C connected to the gate line 11 of the gate line group 11B is preferably set to be equal to the capacitance of the gate line 11 of the gate line group 11A. The capacitance of the capacitance-generating part C connected to the gate line 11 of the gate line group 11B, however, does not have to be equivalent to the capacitance of the gate line 11 of the gate line group 11A, as long as the capacitance is equal to or smaller than the capacitance of the gate line 11 of the gate line group 11A. In the present embodiment, for example, as to one gate line 11 of the gate line group 11B, capacitance is generated in a three-pixel unit arranged in a direction in which the gate line 11 extends. The size of the capacitance-generating part C of the three-pixel unit is determined so that capacitance corresponding to three pixels (for example, about 2 pF) can be generated. The size of the capacitance-generating part for generating a capacitance of about 2 pF is a size having a width in the data line 12 extending direction of about 85 μm, and having a width in the gate line 11 extending direction of about 155 μm. In the present embodiment, the capacitance-generating part of this size is assumed to be one unit, and a plurality of the capacitance-generating parts C are linked and connected to one gate line 11. For example, in a case where the capacitance-generating part corresponding to twenty units are connected to one gate line 11, therefore, the capacitance can be increased by about 40 pF. In this example, as illustrated in FIG. 5A, for the capacitance-generating part C, the connection part 16a is provided per every three pixels, but at least one connection part 16a may be provided.

Figure 6A:
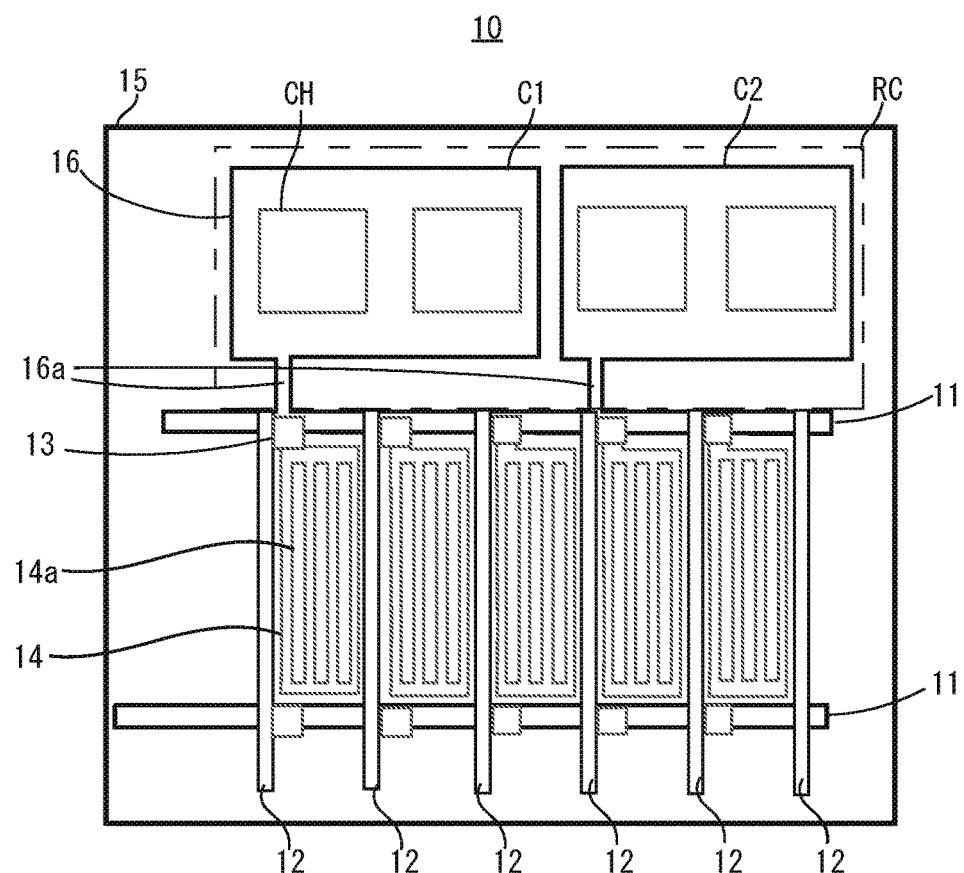
FIG. 6A schematically illustrates capacitance-generating parts having a shape different from that of the capacitance-generating parts illustrated in FIG. 5A.
Figure 6B:
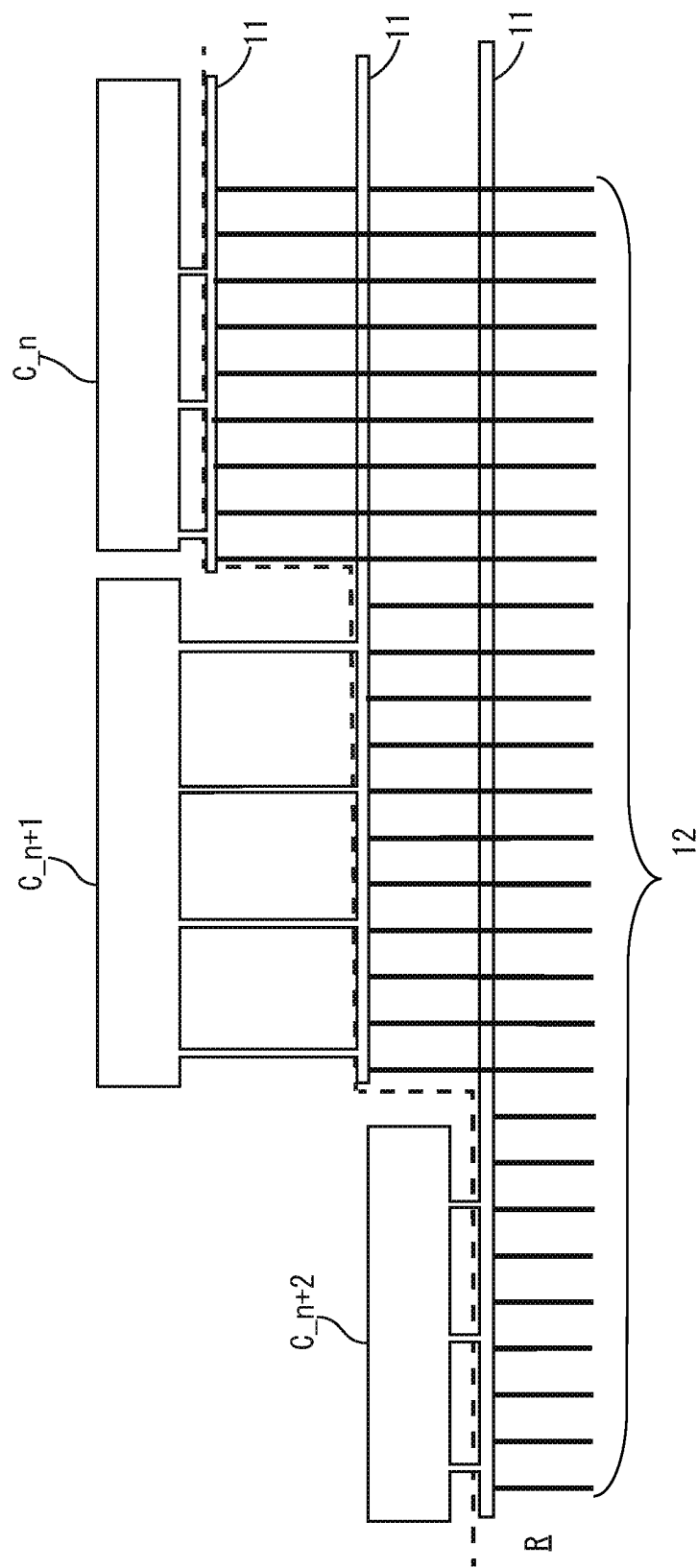
FIG. 6B schematically illustrates an exemplary arrangement of capacitance-generating parts different from that illustrated in FIG. 4.

In the above-described example, the configuration is such that a plurality of three-pixel-unit capacitance-generating parts C are linked, but as illustrated in FIG. 6A, three-pixel-unit capacitance-generating parts C1, C2 may be arranged so as to be positioned apart from each other. In this case, every capacitance-generating part is provided with the connection part 16a for connection with the gate line 11. Further, in the above-described example, the capacitance-generating part C for each gate line 11 is provided outside the display area R, in the vicinity of the boundary of the display area R; the capacitance-generating part C, however, may be provided at a position apart from the boundary of the display area R. For example, as illustrated in FIG. 6B, the capacitance-generating parts C_n, C_n+2 are arranged outside the display area R, in the vicinity of the boundary of the display area R, and the capacitance-generating part C_n+1 is provided at a position apart from the boundary of the display area R.

Next, the following description describes a process for producing the active matrix substrate 10 in the present embodiment. FIGS. 7A to 7G are cross-sectional views illustrating a process for producing the TFT area and the capacitance-generating area RC in the active matrix substrate 10.

First, on the glass substrate 100, for example, films of titanium (Ti), aluminum (Al), and titanium (Ti) are sequentially formed in this order by sputtering or the like, and then, known photolithography and etching are carried out so as to pattern the laminate film (gate layer) of titanium (Ti), aluminum (Al), and titanium (Ti). More specifically, a photoresist is applied on a laminate film (gate layer) obtained by forming films of titanium (Ti), aluminum (Al), and titanium (Ti), and the photoresist is exposed and developed by using a photomask having a desired pattern, whereby the photoresist is patterned. Then, using the patterned photoresist as a mask, the laminate film (gate layer) is etched, and the photoresist is removed. Through these steps, the gate electrode 13a is formed in the TFT area, and the electrode 16 is formed in the capacitance-generating area RC (see FIG. 7A). Though not illustrated in FIG. 7A, the gate line 11 is also formed simultaneously when the gate electrode 13a and the electrode 16 are formed.

Figure 7A:
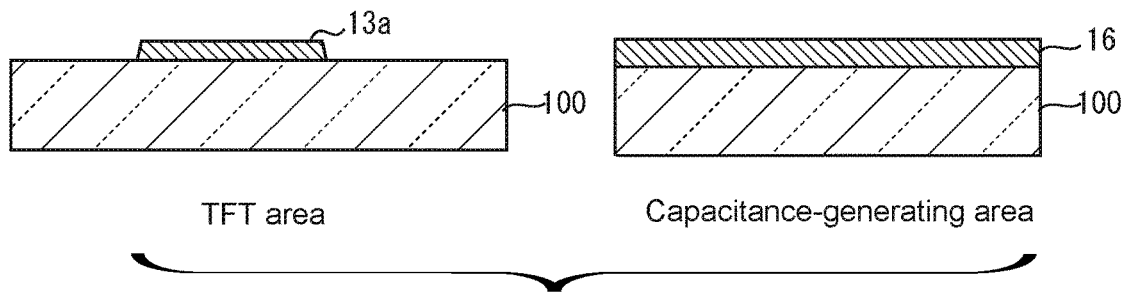
FIG. 7A is a cross-sectional view illustrating a process for producing the active matrix substrate of Embodiment 1, which is a cross-sectional view illustrating a state in which a gate electrode is formed in a TFT area, and an electrode is formed in a capacitance-generating area.

Next, for example, a silicon nitride ($SiN_x$) film is formed by chemical vapor deposition (CVD) so as to cover the gate electrode 13a and the electrode 16 illustrated in FIG. 7A, whereby the gate insulating film 101 is formed. Subsequently, an amorphous silicon (a-Si) film, and an n+amorphous silicon (a-Si) film are formed sequentially. Through these steps, the gate insulating film 101 and the semiconductor layer 102 are formed in the TFT area and the capacitance-generating area RC (see FIG. 7B).

Figure 7B:
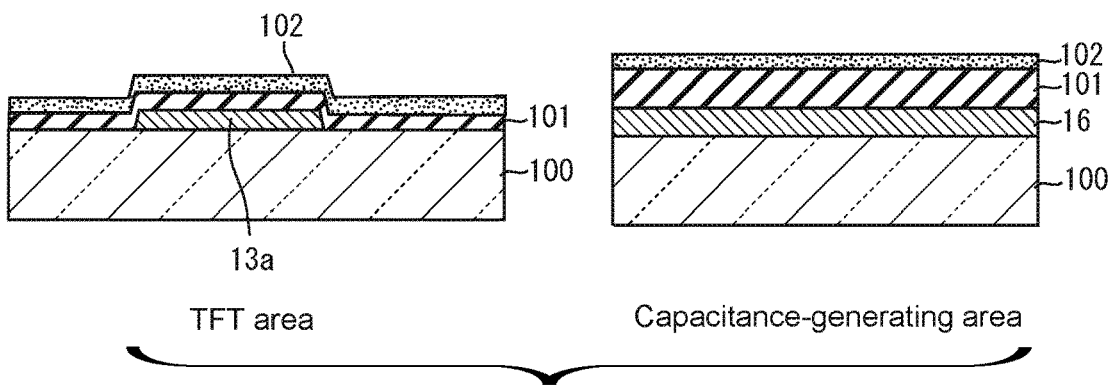
FIG. 7B is a cross-sectional view illustrating a state in which a gate insulating film and a semiconductor layer are formed in the TFT area and the capacitance-generating area illustrated in FIG. 7A.
Figure 7C:
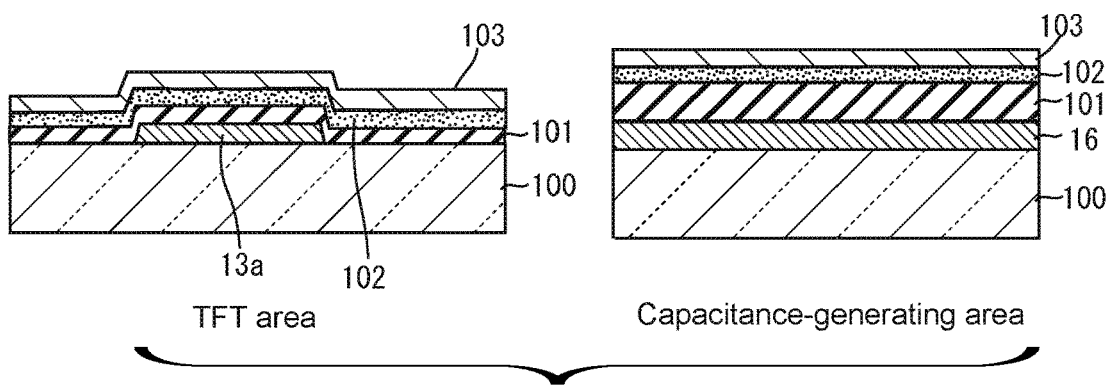
FIG. 7C is a cross-sectional view illustrating a state in which a metal film (source layer) is formed on the semiconductor layer illustrated in FIG. 7B.

Next, for example, a film of molybdenum niobium (MoNb) is formed by sputtering so as to cover the semiconductor layer 102 illustrated in FIG. 7B, and the film is patterned by carried out photolithography and etching. Through these steps, a metal film (source layer) 103 is formed on the semiconductor layer 102 in the TFT area and the capacitance-generating area RC (see FIG. 7C).

Subsequently, a photoresist is applied over the on the metal film (source layer) 103, the photoresist is patterned by using a photomask, and then, the metal film (source layer) 103, and the semiconductor layer 102 obtained by laminating the amorphous silicon (a-Si) film and the n+amorphous silicon (a-Si) film, are etched serially. Through this step, the metal film (source layer) 103 and the semiconductor layer 102 are patterned in substantially the same shape. Thereafter, the photoresist is removed (see FIG. 7D).

Figure 7D:
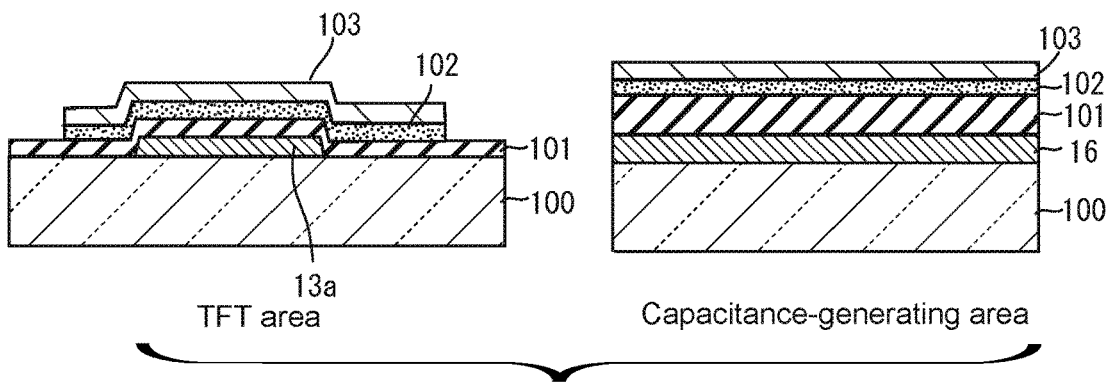
FIG. 7D is a cross-sectional view illustrating a state in which the metal film (source layer) and the semiconductor layer illustrated in FIG. 7C are patterned.

Next, a transparent conductive film made of IZO is formed by, for example, sputtering so as to cover the metal film (source layer) 103 illustrated in FIG. 7D, and then, the transparent conductive film is patterned by photolithography and etching. Here, first, a photoresist is applied over the transparent conductive film, and the photoresist is patterned by using photomask. This photoresist pattern is provided in a shape corresponding to an approximately entire pattern of the metal film (source layer) 103, in addition to a portion where the pixel electrode is to be formed. However, a portion that is to become the channel area of the TFT is excluded. Then, using the patterned photoresist as a mask, the transparent conductive film, and the pattern of the of the metal film (source layer) 103 of the portion that is to become the channel area of the TFT are wet-etched. Thereafter, the n+amorphous silicon film of the portion that is to become the channel area of the TFT is dry-etched. Thereafter, the photoresist is removed.

Through this step, in the TFT area, the channel area of the TFT, the data line 12 and the source electrode 13c, as well as the drain electrode 13d are formed. Further, the pixel electrode 14 is formed on the data line 12 and the source electrode 13c, as well as the drain electrode 13d, in the TFT area, while the transparent electrode film 104 is formed on the metal film (source layer) 103 in the capacitance-generating area RC (see FIG. 7E). Incidentally, when the n+amorphous silicon film is dry-etched, the surface of the amorphous silicon layer, corresponding to the portion that is to become the channel area, is partially etched, and therefore, this potion has a thickness smaller than the thickness in other areas.

Subsequently, a film of silicon nitride ($SiN_x$), for example, is formed as the first insulating film by CVD, which is followed by the formation of a film of, for example, silicon nitride ($SiN_x$) as the second insulating film. Then, photolithography and etching are carried out so that the first insulating film and the second insulating film thus laminated are patterned. This patterning is not carried out within the display area R, but is carried out in the capacitance generating area RC, in reconnection parts with the gate layer and the source layer that are formed outside the display area R, or in contact holes in terminal parts, and the like, for receiving signals from the gate driver 140 and the source driver 130. Through these steps, on the pixel electrode 14 in the TFT area, the first insulating film 105 and the second insulating film 106 thus laminate are formed over an entirety of the surface. Further, on the transparent electrode film 104 in the capacitance-generating area RC, the first insulating film 105 and the second insulating film 106 having contact holes CH formed therein are formed (see FIG. 7F). In this example, two layers of the first insulating film 105 and the second insulating film 106 are provided, though only a single layer may be sufficient. By providing a two-layer insulating film, pin holes can be reduced and the film can be formed thick, whereby leakage occurring between the data line 12 and the common electrode 15 to be described below can be reduced.

Next, a transparent conductive film made of, for example, IZO or the like is formed by sputtering so as to cover the second insulating film 106, and then, photolithography and etching are carried out so as to pattern the transparent conductive film. Through this step, the common electrode 15 is formed on a part of the second insulating film 106 in the TFT area. Further, the common electrode 15 is formed so as to cover the second insulating film 106 in the capacitance-generating area RC, and the common electrode 15 and the transparent electrode film 104 are connected with each other via the contact hole CH (see FIG. 7G).

Described above is an exemplary process for producing the active matrix substrate 10 in the present embodiment. In the above-described producing process, the active matrix substrate 10 can be produced by using five photomasks. In the above-described producing process, the material used for forming the gate layer and source layer is not limited to the above-described material, and a material such as copper (Cu), molybdenum (Mo), aluminum (Al), titanium (Ti), or the like may be used. For example, as the source layer 103, a layer obtained by laminating aluminum (Al) or an alloy of aluminum on a lower layer of molybdenum niobium (MoNb) may be used. Through these steps, the resistance of the data line 12 can be reduced. Further, the material for the pixel electrode 14 and the common electrode 15 is not limited to the above-described material, and instead, for example, indium tin oxide (ITO), zinc oxide (ZnO), indium gallium zinc oxide (IGZO), indium tin zinc oxide (ITZO), or the like may be used. Further, in the TFT 13, amorphous silicon may be used for forming the semiconductor layer, or alternatively, an oxide semiconductor layer may be used. Still further, in this case, the semiconductor layer does not have to be doped with an impurity.

In Embodiment 1 described above, the capacitance-generating parts C are connected to the gate lines 11 of the gate line group 11B (see FIG. 2 and the like) having smaller lengths, as compared with the gate line group 11A (see FIG. 2 and the like) having the maximum length in the substrate width direction. The capacitance-generating part C generates capacitance between the electrode 16 (the lower electrode) connected with the gate line 11, and the transparent electrode film 104 and the metal film 103 (the upper electrode 151) connected with the common electrode 15. This makes it possible to increase the capacitance of the gate line 11 of the gate line group 11B by the capacitance generated in the capacitance-generating part C. The difference from the capacitance of the gate line 11 having the greatest length in the substrate width direction can be therefore decreased, as compared with a case where no capacitance-generating part C is connected with the gate line 11 of the gate line group 11B. As a result, variations in waveform dullness between the gate lines 11 of the gate line group 11A and the gate lines 11 of the gate line group 11B can be reduced, and display defects such as flicker and the like can be suppressed. Further, in Embodiment 1, the capacitance-generating parts C are provided for the gate lines 11 of the gate line group 11B outside the display area R, and therefore, the arrangement of the data lines 12 is not limited, as compared with a case where all of the data lines 12 are caused to intersect with all of the gate lines 11.

EMBODIMENT 2

Figure 8:
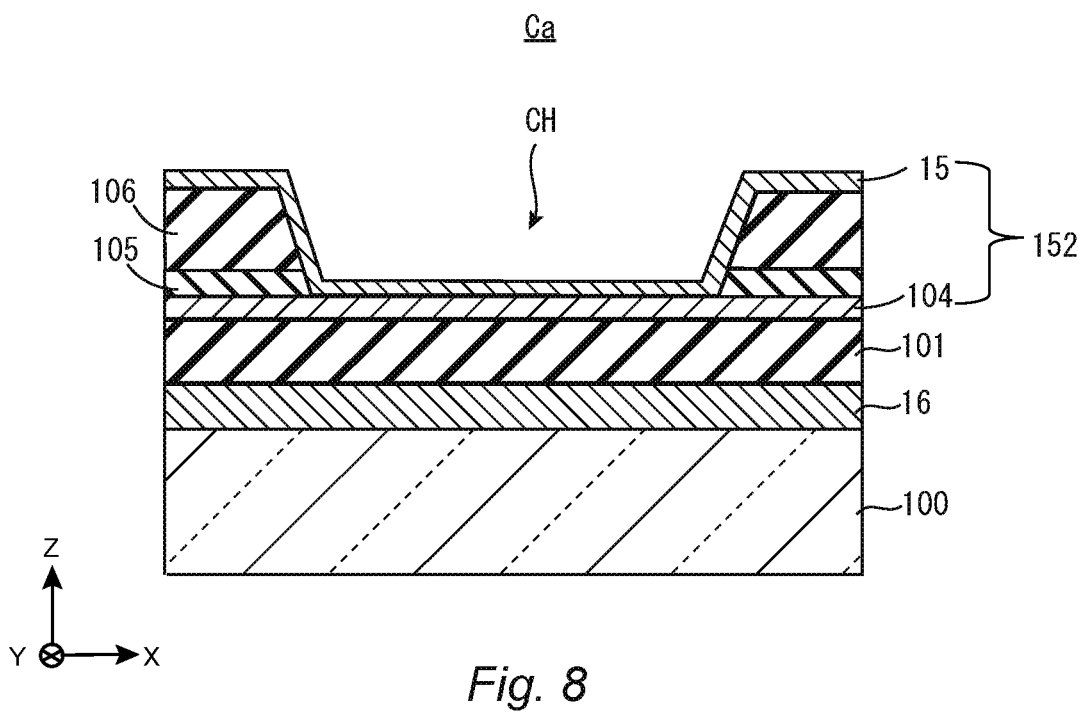
FIG. 8 is a cross-sectional view illustrating an exemplary capacitance-generating part in Embodiment 2.
Figure 9:
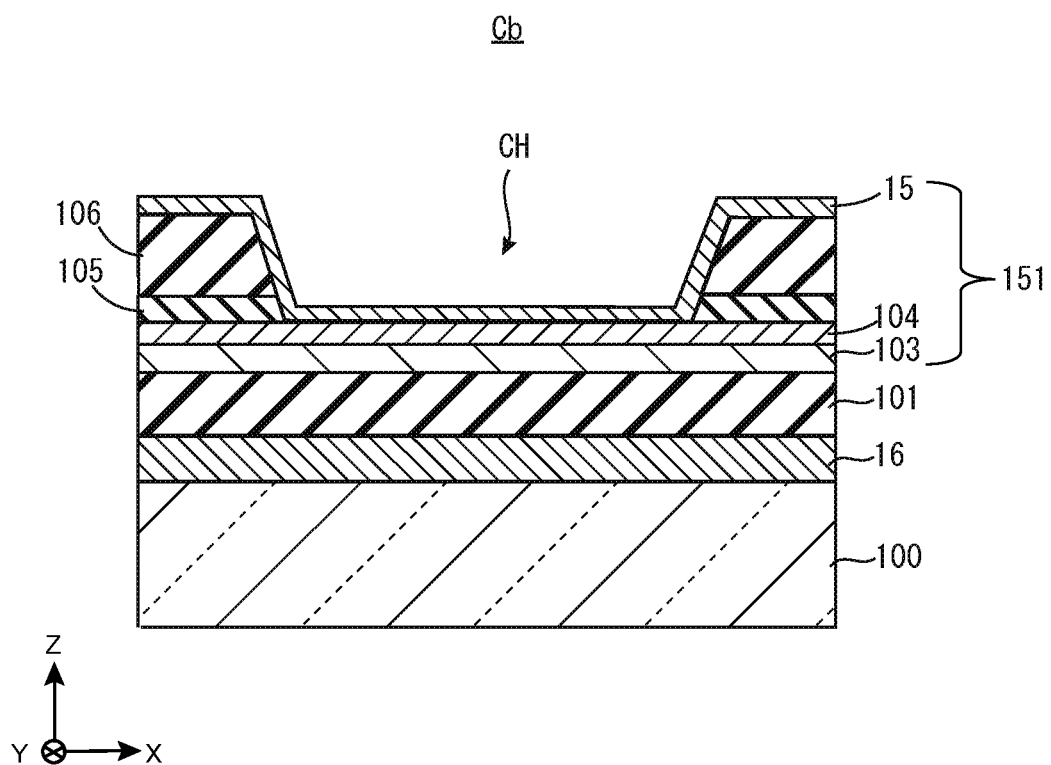
FIG. 9 is a cross-sectional view illustrating another exemplary capacitance-generating part in Embodiment 2.

The following description describes, as the present embodiment, a structure of the capacitance-generating part different from that of Embodiment 1. FIGS. 8 and 9 are cross-sectional views illustrating an exemplary capacitance-generating part in the present embodiment. In FIGS. 8 and 9, members identical to those in Embodiment 1 are denoted by the same reference symbols as those in Embodiment 1. The following description describes the configuration of each capacitance-generating part illustrated in FIGS. 8 and 9, principally regarding points different from those in Embodiment 1.

A capacitance-generating part Ca illustrated in FIG. 8 is different from the capacitance-generating part in Embodiment 1 in the point that the metal film (source layer) 103 and the semiconductor layer 102 are not provided below the transparent electrode film 104. In other words, the upper electrode 151 of the capacitance-generating part C in Embodiment 1 is composed of the transparent electrode film 104 and the metal film (source layer) 103 connected with the common electrode 15, but an upper electrode 152 of the capacitance-generating part Ca is composed of only the transparent electrode film 104 connected with the common electrode 15.

In a case where an active matrix substrate 10 including the capacitance-generating parts Ca is produced, the step of FIG. 7B is carried out after the above-described step of FIG. 7A, whereby a gate insulating film 101 is formed so as to cover the gate electrode 13a and the electrode 16, and the amorphous silicon (a-Si) film and the n+amorphous silicon (a-Si) film are formed sequentially.

Thereafter, photolithography and etching are carried out so as to pattern the laminate film of the amorphous silicon (a-Si) film and the n+amorphous silicon (a-Si) film. Through these steps, an island-like semiconductor layer 102 is formed on the gate insulating film 101 in the TFT area (see FIG. 10A).

Subsequently, for example, a film of molybdenum niobium (MoNb) is formed by sputtering, and then, photolithography and etching are carried out so as to pattern the film. Through this step, a metal film (source layer) 103 is formed on the semiconductor layer 102 in the TFT area (see FIG. 10B).

Figure 7E:
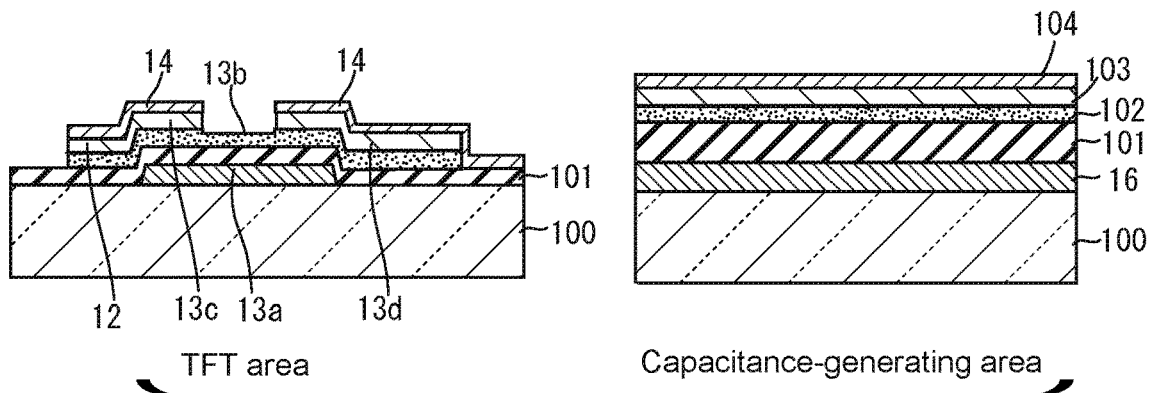
FIG. 7E is a cross-sectional view illustrating a state in which a data line, a source electrode, a drain electrode, and a pixel electrode are formed in the TFT area illustrated in FIG. 7C, and a transparent electrode film is formed on the metal film (source layer) in the capacitance-generating area illustrated therein.
Figure 7F:
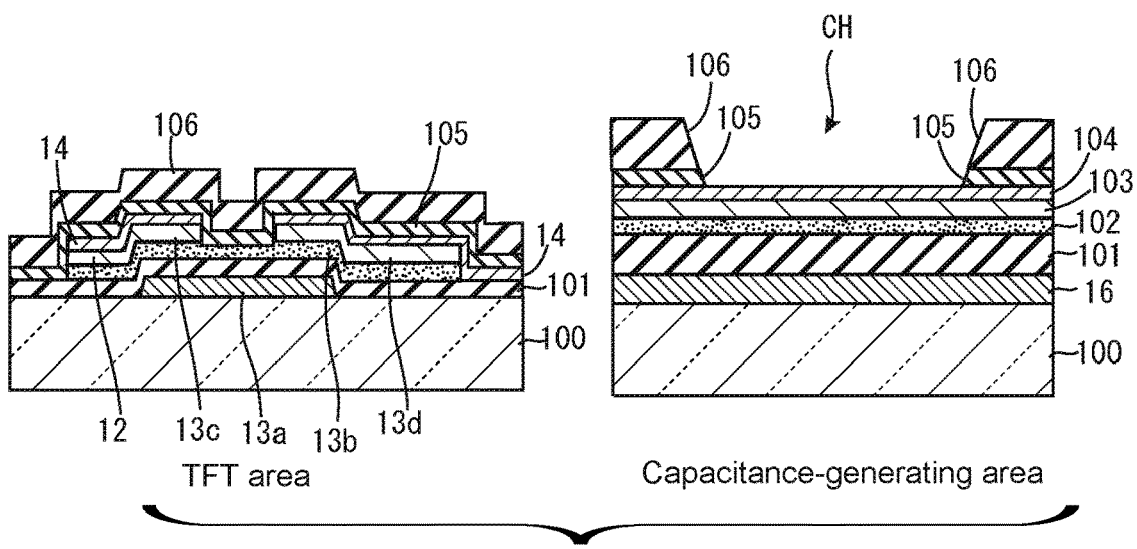
FIG. 7F is a cross-sectional view illustrating a state in which a first insulating film and a second insulating film are formed on the pixel electrode in the TFT area illustrated in FIG. 7E, and on the transparent electrode film in the capacitance-generating area illustrated therein.
Figure 7G:
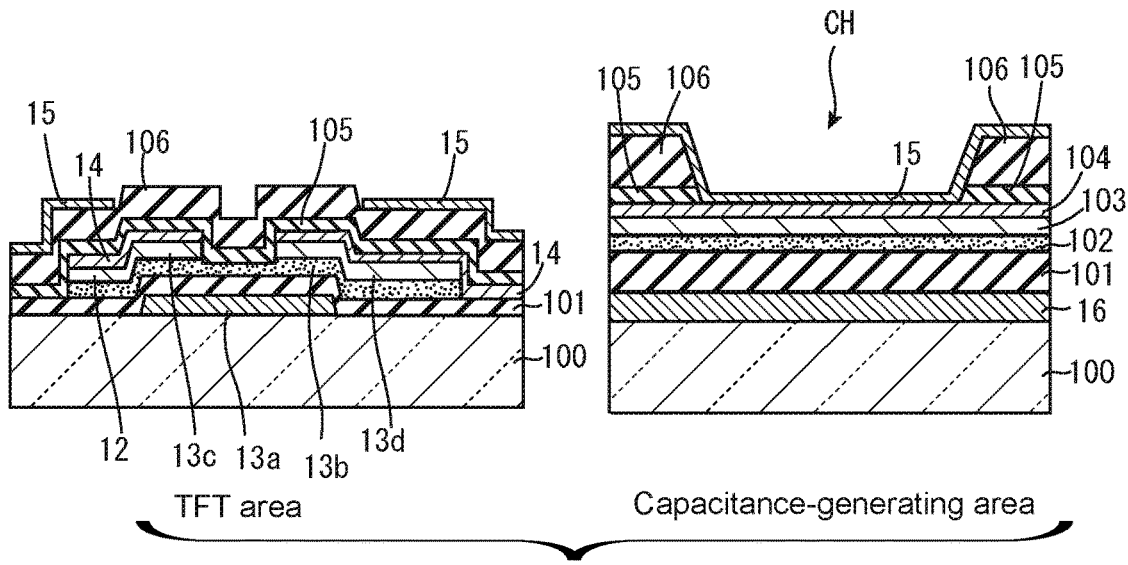
FIG. 7G is a cross-sectional view illustrating a state in which on the second insulating film in the TFT area illustrated in FIG. 7F, and a common electrode is formed on the second insulating film in the capacitance-generating area illustrated therein.

Thereafter, by carrying out the steps of FIGS. 7E to 7G in Embodiment 1, the active matrix substrate 10 including the capacitance-generating parts Ca is formed.

Next, the following description describes a capacitance-generating part Cb illustrated in FIG. 9. As illustrated in FIG. 9, the capacitance-generating part Cb is different from the capacitance-generating part in Embodiment 1 in the point that the semiconductor layer 102 is not provided between an upper electrode 151 identical to that in Embodiment 1 and the electrode 16 (lower electrode) connected to the gate line 11.

Figure 10A:
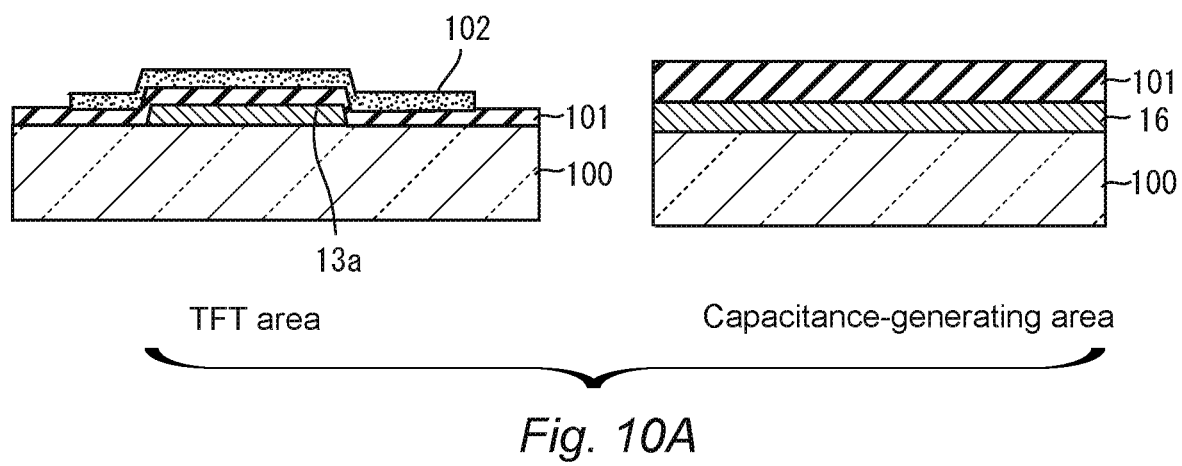
FIG. 10A is a cross-sectional view illustrating a process for producing a capacitance-generating part illustrated in FIG. 8, which is a cross-sectional view illustrating a state in which an island-like semiconductor layer is formed on the gate insulating film in the TFT area.
Figure 10B:
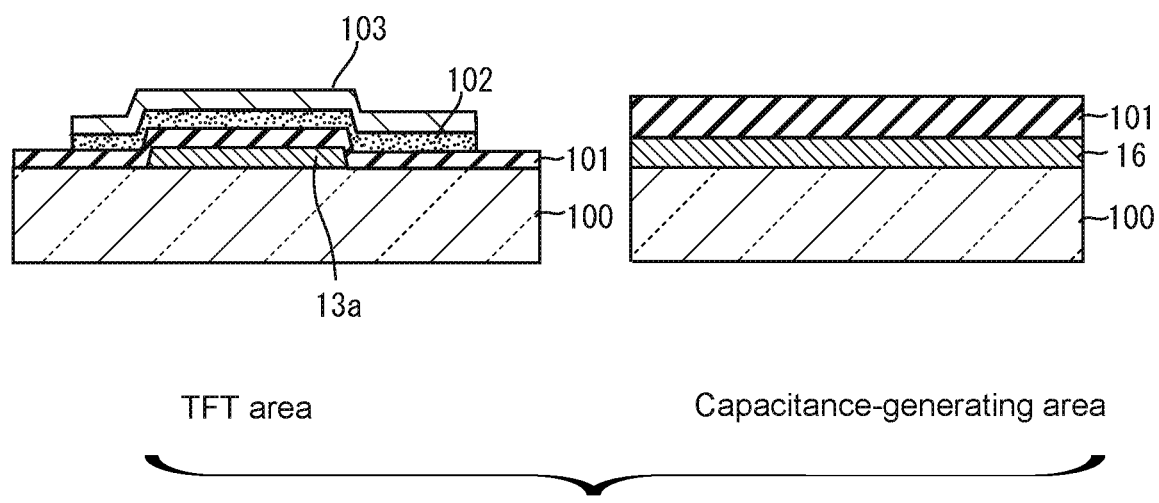
FIG. 10B is a cross-sectional view illustrating a state in which a metal film (source layer) is formed on the semiconductor layer in the TFT area illustrated in FIG. 10A.

In the process for producing the active matrix substrate 10 including the capacitance-generating parts Cb, the steps of FIGS. 7A, 7B are carried out as is the case with Embodiment 1, and thereafter, the above-described step of FIG. 10A is carried out. After the island-like semiconductor layer 102 is formed in the TFT area by the step of FIG. 10A, the steps of FIGS. 7C to 7G are carried out in the same manner as that in Embodiment 1, whereby the active matrix substrate 10 including the capacitance-generating parts Cb are formed.

In the case of the capacitance-generating parts Ca and Cb, the step of patterning the semiconductor layer 102 illustrated in FIG. 10A is added, as compared with Embodiment 1, and six photomasks are required. The capacitance-generating parts Ca and Cb, however, can generate more stable capacitances, since no semiconductor layer 102 is provided between the upper electrode 151, 152 and the lower electrode (the electrode 16). Further, the capacitance-generating parts Ca are provided with respect to the gate lines 11 of the gate line group 11B (see FIG. 2 and the like) as is the case with Embodiment 1, which results in that capacitance differences between the gate lines 11 of the gate line group 11A and those of the gate line group 11B can be reduced. Consequently, variations in waveform dullness between the gate lines 11 of the gate line group 11A and the gate lines 11 of the gate line group 11B can be reduced, and display defects such as flicker can be suppressed.

EMBODIMENT 3

Embodiments 1 and 2 are described above with reference to an exemplary configuration of the upper electrode in the capacitance-generating part in which only the transparent electrode film 104, or the transparent electrode film 104 and the metal film 103, are connected to the common electrode 15 provided in the capacitance-generating area RC. As the present embodiment, an exemplary configuration is described in which the common electrode 15 provided in the capacitance-generating area RC functions as an upper electrode, and a lower electrode has a configuration different from that in Embodiments 1 and 2.

Figure 11:
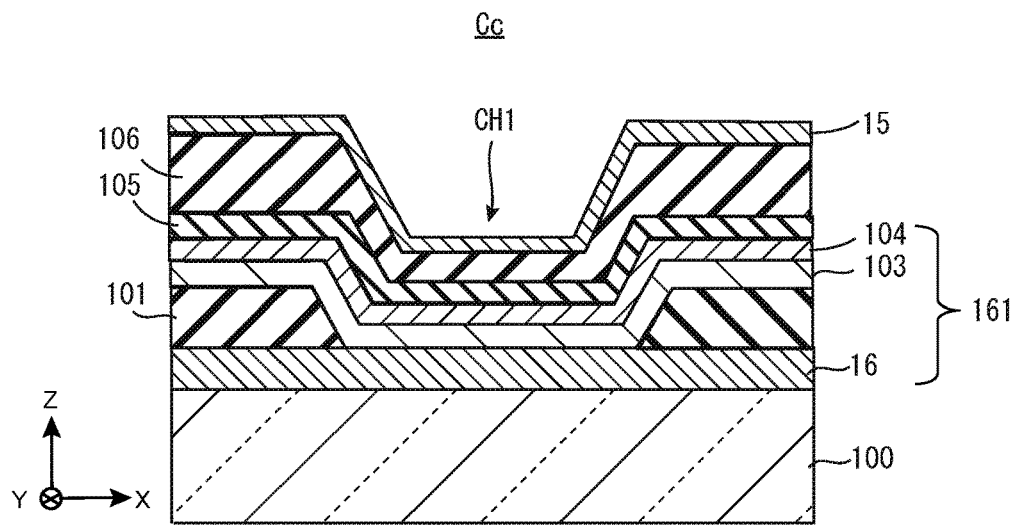
FIG. 11 is a cross-sectional view illustrating a capacitance-generating part of Embodiment 3.

FIG. 11 is a cross-sectional view illustrating a capacitance-generating part in the present embodiment. As illustrated in FIG. 11, a capacitance-generating part Cc in the present embodiment is not provided with the semiconductor layer 102, as is the case with Embodiment 2. In the capacitance-generating part Cc, a lower electrode 161 is composed of the electrode 16, a metal film (source layer) 103 connected with the electrode 16 via a contact hole CH1, and a transparent electrode film 104 provided so as to overlap with the metal film (source layer) 103. Between the transparent electrode film 104 and the common electrode 15, a first insulating film 105 and a second insulating film 106 are laminated and arranged. The capacitance-generating part Cc, therefore, has such a configuration that the common electrode 15 provided in the capacitance-generating area RC functions as an upper electrode, and capacitance is generated between this upper electrode and the lower electrode 161 that is composed of the electrode 16, the transparent electrode film 104, and the metal film (source layer) 103.

In the present embodiment, a photomask is required for forming a contact hole CH1 in the gate insulating film 101, but the electrode 16 may have a size sufficient for being connected to the metal film (source layer) 103 at the contact hole CH1. Therefore, even in a case where the capacitance-generating part C is arranged in the vicinity of two adjacent ones of the gate lines 11, as is the case with the capacitance-generating parts C_n+1, C_n+2 illustrated in FIG. 4, it is possible to suppress short-circuiting that would occur when the electrode 16 is positioned close to the gate line 11.

Examples of the liquid crystal display device according to the present invention are described above, but the configuration of the liquid crystal display device according to the present invention is not limited to the above-described configurations of the embodiments, and may be any one of a variety of modified configurations.

MODIFICATION EXAMPLE

Figure 12A:
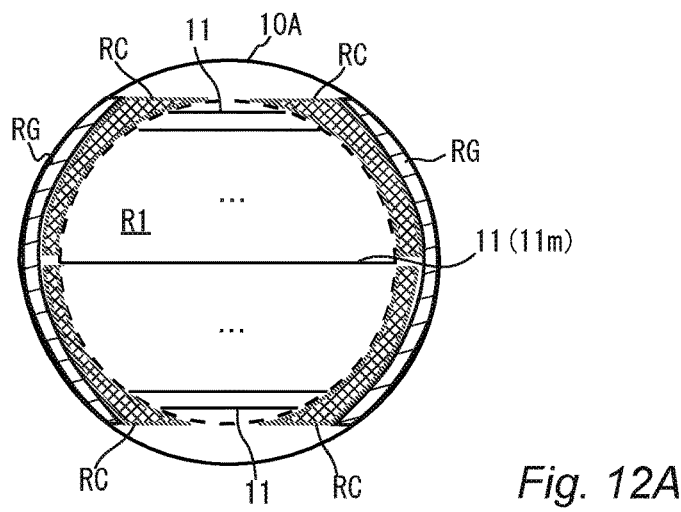
FIG. 12A schematically illustrates a capacitance-generating area provided in an active matrix substrate in a modification example.
Figure 12B:
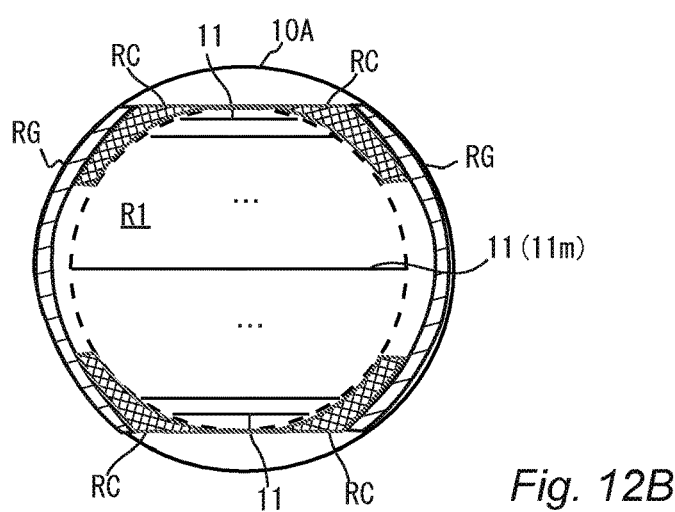
FIG. 12B schematically illustrates an exemplary arrangement of the capacitance-generating area, which is different from the arrangement of the capacitance-generating area illustrated in FIG. 12A.

As the display area in the embodiments described above, an exemplary display area having a non-rectangular shape whose upper part is in a circular arc shape is described, but the shape of the display area is not limited to this. For example, as illustrated in FIGS. 12A and 12B, a circular active matrix substrate 10A may have a circular display area R1. In this case, driving circuit areas RG used for arranging the gate driver 140 along the outer shape of the active matrix substrate 10A may be provided outside the display area R1, and the capacitance-generating areas RC may be provided between the driving circuit areas RG and the boundary of the display area R1. The capacitance-generating areas RC may be provided in the vicinity of ends of the gate lines 11 other than the gate lines 11 (gate lines 11m) having the greatest lengths in the substrate width direction, outside the display area R1, as illustrated in FIG. 12A. Or alternatively, the capacitance-generating areas RC may be provided in the vicinity of ends of a part of the gate lines 11, outside the display area R1 as illustrated in FIG. 12B, so that the number of the data lines 12 (see FIG. 2 and the like) intersecting the foregoing gate lines 11 is equal to or lower than a predetermined number.

The invention claimed is:

1. A liquid crystal display device comprising an active matrix substrate, a counter substrate, and a liquid crystal layer interposed between the active matrix substrate and the counter substrate,
the active matrix substrate includes:
a plurality of gate lines;
a plurality of data lines;
a plurality of pixel electrodes provided in a plurality of pixels, respectively, the pixels being defined by the gate lines and the data lines;
a common electrode provided in a display area composed of the pixels; and
capacitance-generating parts that are provided outside the display area, and that generate capacitances between a group of the gate lines among the plurality of the gate lines and the common electrode, wherein
the gate lines of the group have a length smaller than that of the gate line having a maximum length, and intersect with a group of the data lines,
the capacitance-generating parts are provided in such a manner that at least one capacitance-generating part is provided with respect to one gate line among the gate lines of the group,
each capacitance-generating part includes an upper electrode, a lower electrode, and an insulating layer provided between the upper electrode and the lower electrode,
each of the upper electrode and the lower electrode is formed with at least one of a first transparent electrode film made of the same material as that of the pixel electrodes, a second transparent electrode film made of the same material as that of the common electrode, a first metal film made of the same material as that of the gate lines, and a second metal film made of the same material as that of the data lines,
the active matrix substrate further includes a plurality of switching elements that include semiconductor films,
the upper electrode includes the second metal film, the first transparent electrode film, and the second transparent electrode film that is connected to the first transparent electrode film and is connected to the common electrode,
the lower electrode includes the first metal film connected with the gate lines of the group, and
each capacitance-generating part includes a semiconductor layer made of the same material as that of the semiconductor film, between the upper electrode and the insulating layer.

2. The liquid crystal display device according to claim 1, wherein the capacitance-generating parts are provided in the vicinity of ends of the gate lines of the group.

3. The liquid crystal display device according to claim 1, wherein the active matrix substrate further includes, outside the display area, a plurality of driving circuits for scanning the gate lines, and lines that supply a control signal to the driving circuits,
the lines are made of the same material as that of at least either the gate lines or the data lines, and
the capacitance-generating parts are provided between the driving circuits and a boundary of the display area.

4. The liquid crystal display device according to claim 3, wherein the active matrix substrate further includes a plurality of pixel switching elements that are provided with respect to the pixels, respectively,
the driving circuits include a plurality of driving circuit switching elements, and
each of the pixel switching elements and the driving circuit switching elements includes a semiconductor film made of a same material.

5. The liquid crystal display device according to claim 1, wherein the counter substrate further includes a light shielding film outside the display area, and
the capacitance-generating parts overlap with the light shielding film when viewed in a plan view.

6. The liquid crystal display device according to claim 1, wherein the display area, the active matrix substrate, and the counter substrate have a non-rectangular shape.

* * * * *